(12) United States Patent
Thompson et al.

(10) Patent No.: US 7,966,795 B2
(45) Date of Patent: Jun. 28, 2011

(54) MOWING DEVICE, A KNIFE ADAPTER FOR SUCH A MOWING DEVICE, A RETAINER FOR SUCH A MOWING DEVICE AND METHOD OF USING SAME

(75) Inventors: Kent Thompson, Otley, IA (US); Rustin V. Bentzinger, Pella, IA (US); Martin Koorn, CP Schiedam (NL)

(73) Assignee: Vermeer Manufactruing Company, Pella, IA (US)

( * ) Notice: Subject to any disclaimer, the term of this patent is extended or adjusted under 35 U.S.C. 154(b) by 0 days.

(21) Appl. No.: 12/770,968

(22) Filed: Apr. 30, 2010

(65) Prior Publication Data

US 2010/0205925 A1    Aug. 19, 2010

Related U.S. Application Data

(60) Continuation of application No. 12/336,925, filed on Dec. 17, 2008, now Pat. No. 7,743,478, which is a division of application No. 11/062,981, filed on Feb. 22, 2005, now Pat. No. 7,490,459, which is a continuation-in-part of application No. 10/912,720, filed on Aug. 5, 2004, now Pat. No. 6,959,530, which is a division of application No. 10/387,100, filed on Mar. 12, 2003, now Pat. No. 6,834,486.

(51) Int. Cl.
*A01D 34/00* (2006.01)
(52) U.S. Cl. ........................................................ 56/255
(58) Field of Classification Search .................. 56/12.7, 56/13.6, 255, 295; 30/296.1, 329, 330, 337, 30/339, 276, 341, 351
See application file for complete search history.

(56) References Cited

U.S. PATENT DOCUMENTS

| 2,939,264 A | 6/1960 | Kontis |
| 3,321,894 A | 5/1967 | Ingram |
| 3,452,524 A | 7/1969 | Guetterman |

(Continued)

FOREIGN PATENT DOCUMENTS

EP    0517645    12/1992

*Primary Examiner* — Robert E Pezzuto
(74) *Attorney, Agent, or Firm* — Sturm & Fix LLP

(57) ABSTRACT

A mowing device including a disc, the disc providing a mount for at least one knife, said knife being pivotably mounted to said disc by a pivot pin, said pivot pin defining a mounting axis, such that the knife can rotate about said pivot pin between a first extended position and any retracted position, said disc being constructed of a basic material thickness and comprising a mounting surface; said mowing device including a knife adapter comprising a cylindrical aperture and a projection; said pivot pin comprising a first cylindrical section of a first diameter to fit into said cylindrical aperture in said knife adapter, and a second cylindrical section, of a second diameter, with a groove defined by a groove width and a pin section thickness at the groove of a dimension less than said second diameter; said mowing device including a retainer constructed of a material thickness equal to or less than the width of said groove, with a key-hole shaped aperture defined by a first circular section with a first inside diameter larger than said second diameter of said pin and a slot shaped section with a width that is greater than said pin section thickness but less than said second diameter of said pivot pin; wherein said slot-shaped section of the retainer engages said groove of said pivot pin to retain said pivot pin while said projection of said knife adapter engages said retainer.

2 Claims, 11 Drawing Sheets

U.S. PATENT DOCUMENTS

| | | |
|---|---|---|
| 3,755,999 A | 9/1973 | Meyer |
| 3,918,241 A | 11/1975 | Stillions |
| 4,229,933 A | 10/1980 | Bernard |
| 4,313,297 A | 2/1982 | Maier |
| 4,815,264 A | 3/1989 | Mijnders |
| 4,860,525 A | 8/1989 | Chee |
| 5,271,212 A | 12/1993 | Anderson |
| 5,622,035 A | 4/1997 | Kondo |
| 5,626,007 A | 5/1997 | Harrington |
| 5,791,131 A | 8/1998 | Hill |
| 6,055,798 A | 5/2000 | Fulmer |
| 6,182,430 B1 | 2/2001 | Blarek |
| 6,305,153 B1 | 10/2001 | Neuerburg |
| 6,357,215 B1 | 3/2002 | Thorne |
| 6,367,235 B1 | 4/2002 | Moynihan |
| 6,829,878 B1 | 12/2004 | Hoffman |
| 2002/0194829 A1 | 12/2002 | Petersen |
| 2004/0177484 A1 | 9/2004 | Thompson |

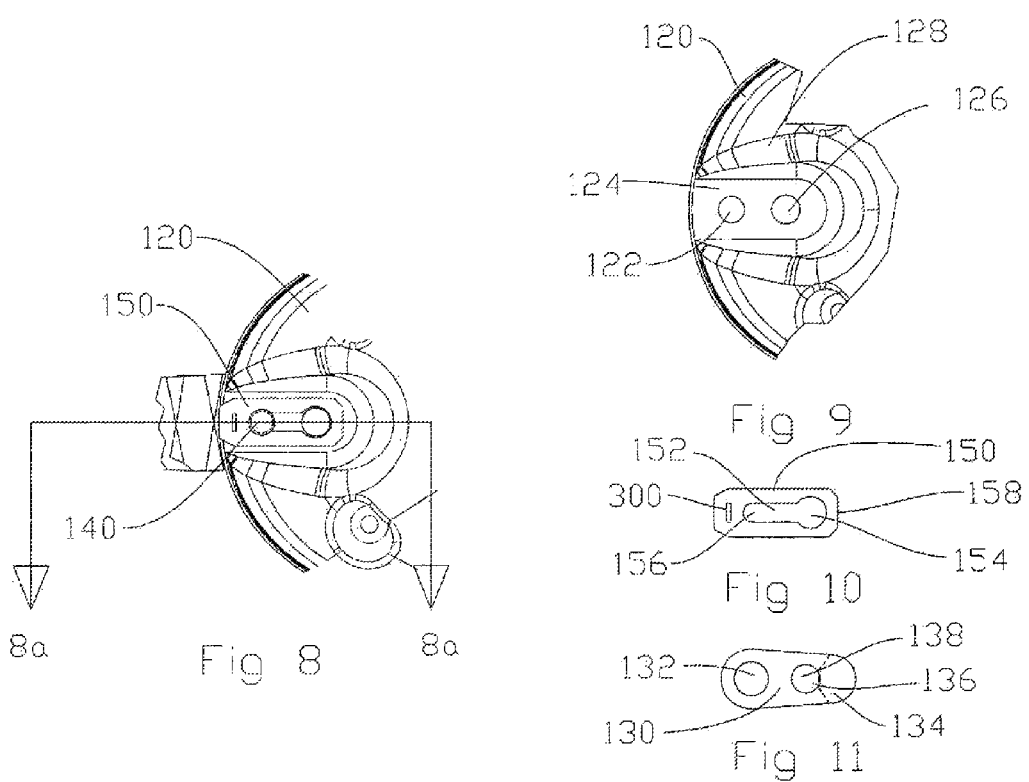

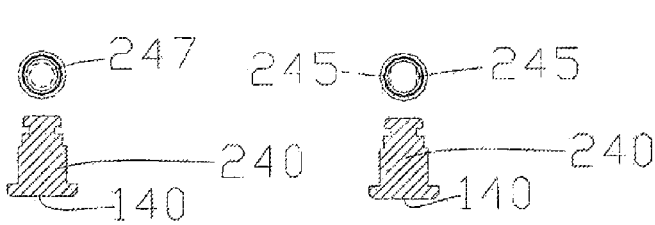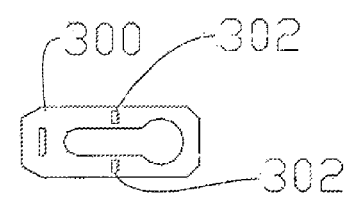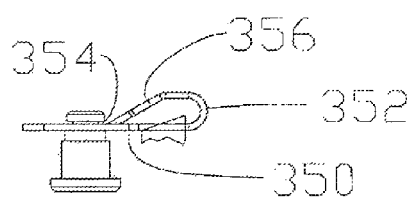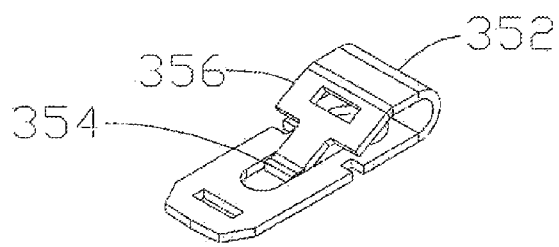

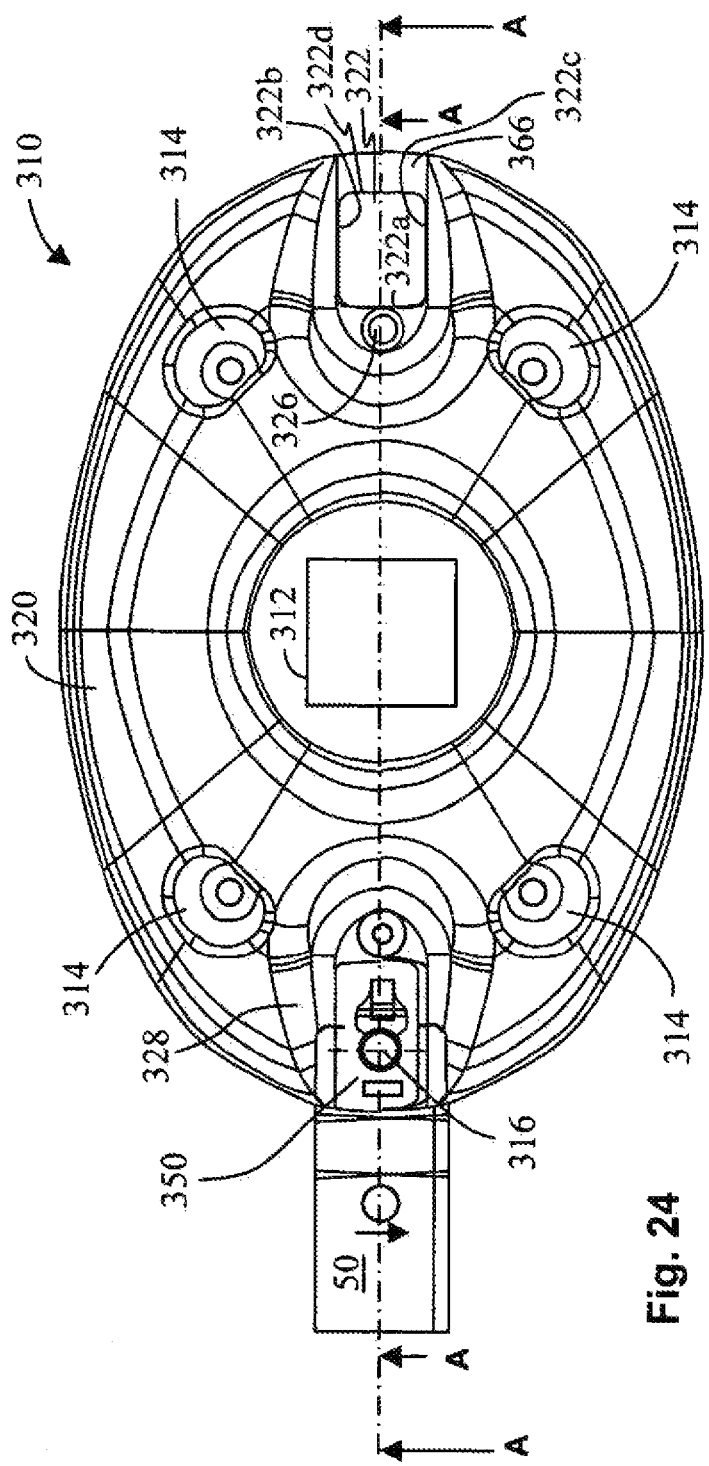
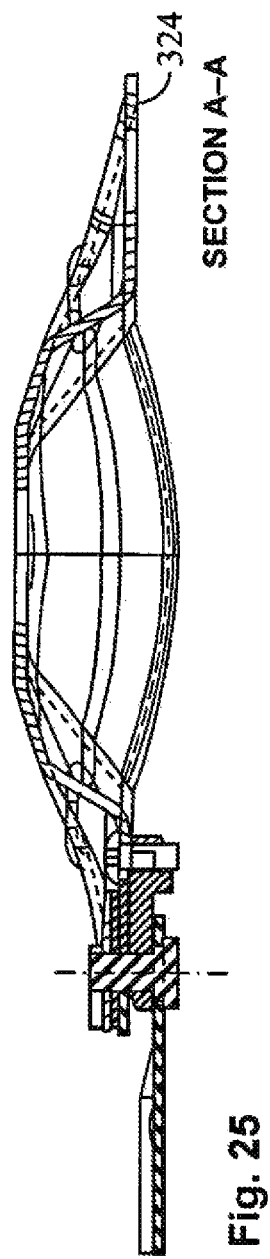
Fig. 24
Fig. 25  SECTION A-A

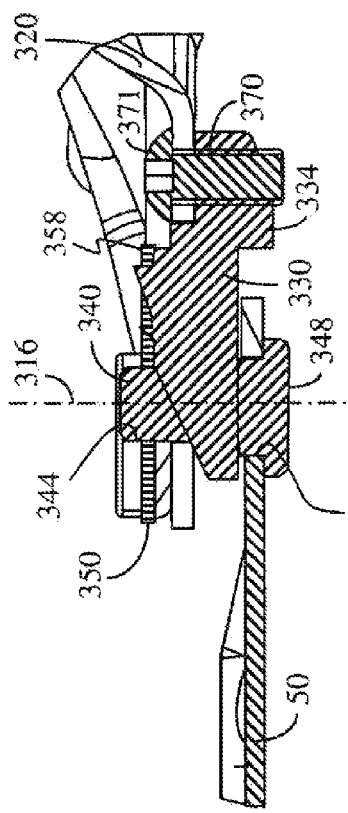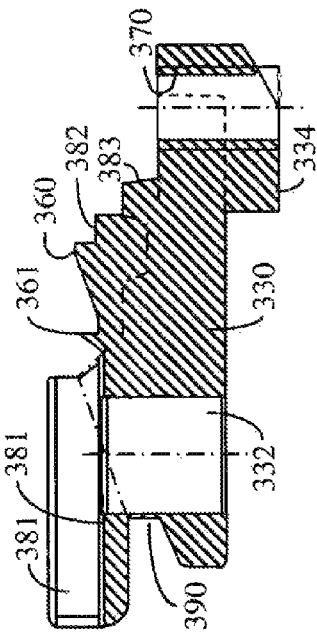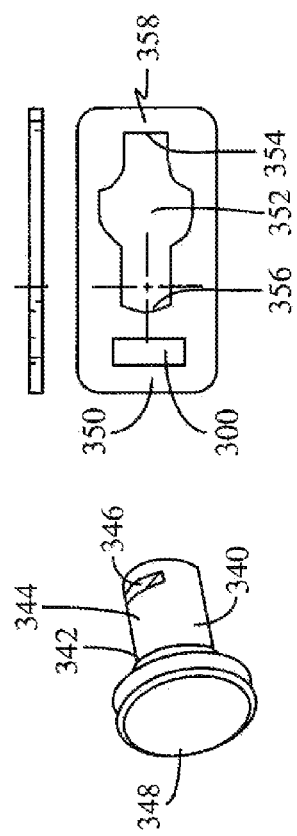

MOWING DEVICE, A KNIFE ADAPTER FOR SUCH A MOWING DEVICE, A RETAINER FOR SUCH A MOWING DEVICE AND METHOD OF USING SAME

CROSS REFERENCE TO RELATED APPLICATIONS

This application is a Continuation of U.S. Ser. No. 12/336,925 filed Dec. 17, 2008, which is a Divisional application of U.S. Ser. No. 11/062,981, filed Feb. 22, 2005, now U.S. Pat. No. 7,490,459 issued Feb. 17, 2009, which is a Continuation-in-Part application of U.S. Ser. No. 10/912,720, filed Aug. 5, 2004, now U.S. Pat. No. 6,959,530, issued Nov. 1, 2005, which is a Divisional of U.S. Ser. No. 10/387,100, filed Mar. 12, 2003, now U.S. Pat. No. 6,834,486, issued Dec. 28, 2004, and are all incorporated by reference herein in their entirety claiming priority therefrom.

BACKGROUND

Field of the Invention

The present invention relates to mowing device having a pivotal mounting arrangement for mounting a knife to a rotary disc, which makes replacement, or reorientation of the blade possible using only common tools.

SUMMARY OF THE INVENTION

Knives used on rotary disc mowers contact the crop material at high speeds, in order to cut effectively. This results in inherent dulling and wear. At times these knives contact other objects such as the ground, rocks etc. causing additional wear. As a result the knives must routinely be maintained.

The knives are pivotally mounted to discs, in a manner to reduce impact loading on the sharpened edge when striking an obstacle. FIGS. 1-4 illustrate a prior art mounting arrangement. Mower disc assembly 10 includes knife adapter 30 that is attached to the bottom side of disc body 20, retained with bolt 15 which passes through aperture 26 of disc 20 and into threaded aperture 36 of knife adapter 30. The knife adapter 30 can alternatively be welded to disc body 20. Knife adapter 30 further includes a cylindrical aperture 32 that is located concentric with a cylindrical aperture 22 of the disc body 20, together defining the pivot axis of knife 50. Knife 50 includes a cylindrical aperture 52, sized to allow sleeve portion 12 of bolt 14 to pass through allowing sufficient clearance so that the knife 50 will pivot freely. The mounting arrangement is completed by installing bolt 14 through the aperture 52 of the blade 50, then through the aperture 32 of knife adapter 30, and finally through aperture 22 of disc body 20, and into its mating nut 16.

The top side of the disc body 20 is in contact with the material being cut, functioning to lift and propel the cut material away from the knife. It is exposed to significant wear, along with any components located on the top side of the disc 20, such as nut 16. If nut 16 is subjected to sufficient wear, the hex configuration of its outer surface can be degraded to the point that a wrench no longer mates adequately to allow removal. In order to protect the nut 16 from this excessive wear prior art mounting arrangements have included a wear protector 17 mounted on the top of the disc body, to protect the nut 16 from this excessive wear.

Disc 20 is adapted to provide for this mounting arrangement by providing mounting surface 24 on disc body 20 for supporting wear protector 17. The disc 20 further includes a transition area to the raised portion 28. This raised portion 28 tapers such that at the far outer diameter of the disc 20, it does not exist. At lesser diameters the raised portion is increasingly larger. This raised portion 28, and the transition area between it and the mounting surface 24, provides protection for bolt 15, which thus does not require a wear protector.

The knife adapter 30 often includes a tab 34 that prevents full rotation of the knife 50, in order to control its location, in order to avoid interference with other components of the machine.

This mounting arrangement requires that the several pieces be disassembled with wrenches in order to maintain the knives which is costly and difficult due to the number of knives on a machine.

According to the present invention there is provided a mowing device having an improved mounting arrangement for a knife to a disc as follows from the appended claims. In addition it provides a method of removing the knife from the disc without the use of wrenches, simply requiring a tool to pry, such as a screw driver. In addition the present invention relates to a knife adapter for use in such a mowing device. A further feature is a low profile retainer that does not need to be protected by a wear protector.

BRIEF DESCRIPTION OF THE DRAWINGS

FIG. 8 is a top plan view and an exploded view of the mounting arrangement of a knife onto a mower disc of the present invention;

FIG. 9 is a partial top plan view of the mower disc configured for the knife mounting arrangement of the present invention;

FIG. 10 is a top plan view of a blade retainer of the knife mounting arrangement of the present invention;

FIG. 11 is a top plan view of a knife adapter of the knife mounting arrangement of the present invention;

FIG. 19 is a side view of a retaining pin of the present invention;

FIG. 20 is a side view of a second embodiment of a retaining pin of the present invention;

FIG. 21 is a top plan view of a retainer of the knife mounting arrangement of the present invention illustrating features to aid disassembly;

FIG. 22 is side view of an alternate embodiment of a retainer; and

FIG. 23 is a perspective view of the retainer in FIG. 22.

FIG. 24 is a top plan view of the mower disc configured for the knife mounting arrangement and a knife mounted in accordance with a third embodiment of the present invention;

FIG. 25 is a cross-sectional side view of a mower disc, as defined by section line A-A in FIG. 24, with a knife mounted in accordance with a third embodiment of the present invention;

FIG. 28 is a partial, cross-sectional side view of a mower disc, as defined by section line A-A in FIG. 24, with a knife mounted in accordance with a third embodiment of the present invention;

FIG. 29 is a cross-sectional side view taken on the centerline of the knife adapter in accordance with a third embodiment of the present invention;

FIG. 30 is a perspective view of the fastening pin by means of which a knife is mounted in accordance with a third embodiment of the present invention;

FIG. 31 is a top plan view of a retainer of the knife mounting arrangement of the third embodiment of the present invention;

DETAILED DESCRIPTION OF THE INVENTION

Figure 1:
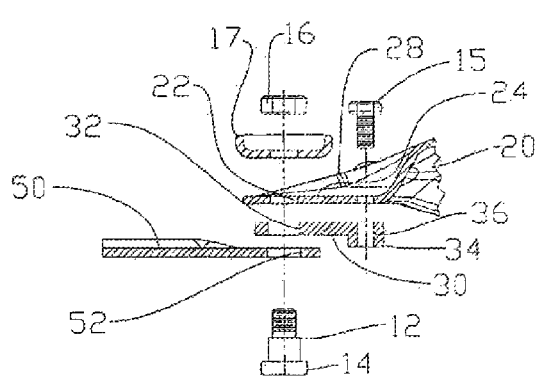
FIG. 1 is an exploded view of a prior art mounting arrangement of a knife onto a mower disc.
Figure 2:
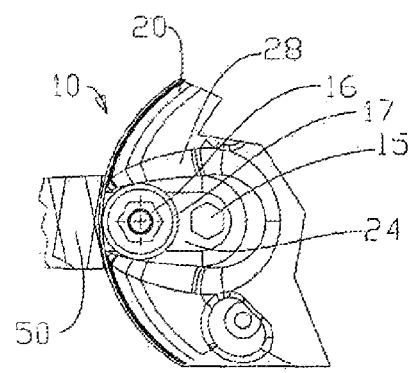
FIG. 2 is a partial top plan view of a mower disc with knife mounted in accordance with the prior art as illustrated in FIG. 1.
Figure 3:
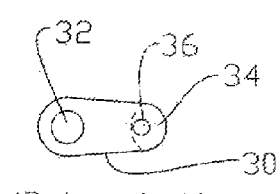
FIG. 3 is a top plan view of a knife adapter of the prior art knife mounting.
Figure 4:
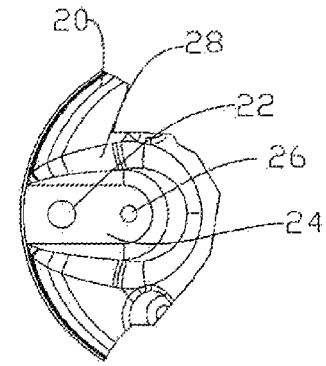
FIG. 4 is a partial top plan view of the mower disc configured for the prior art knife mounting.

Referring now to the drawings, like reference numerals designate identical or corresponding parts throughout the several views. The included drawings reflect the current preferred and alternate embodiments. There are many additional embodiments that may utilize the present invention. The drawings are not meant to include all such possible embodiments.

Figure 5:
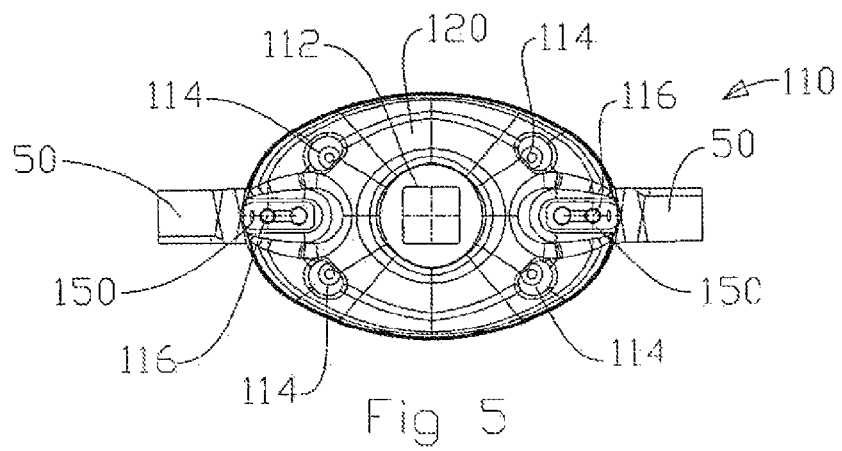
FIG. 5 is a top plan view of a mower disc with knives mounted in accordance with the present invention.
Figure 6:
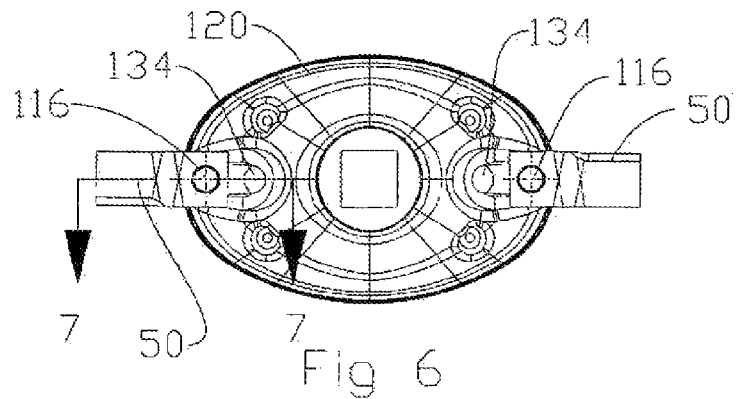
FIG. 6 is a bottom plan view of a mower disc with knives mounted in accordance with the present invention.
Figure 7:
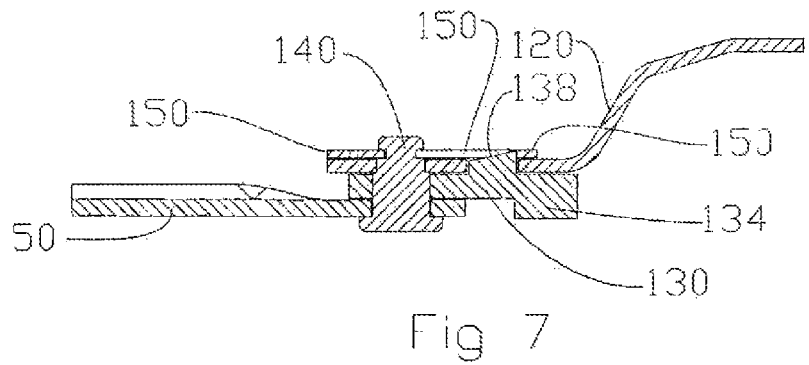
FIG. 7 is a cross-sectional side view of a mower disc, as defined by section line 7-7 in FIG. 6, with the knives mounted in accordance with the present invention.

The FIGS. 5-7 illustrate a mower disc assembly 110 of the present invention. A disc 120 includes a center pilot hole 112 that controls its alignment and location when installed onto a cutter bar which is comprised of a series of gears, a supporting frame/housing, and driveline to transfer power from a tractor PTO to the cutterbar. Additional holes 114 allow retainers, not shown, to securely attach other components such as crop deflectors, not shown, to the mower disc. Two knives 50 are installed onto the bottom of disc body 120, each with a knife adapter 130, a pin 140 and a retainer 150. The knife is free to rotate about pivot axis 116 until it contacts a tab 134 of the knife adapter 130.

FIGS. 8-11 further illustrate a single knife mount of this embodiment of the present invention. The disc body 120 includes two cylindrical apertures 122 and 126, and a mounting surface 124, as illustrated in FIG. 9, on each side, for each knife 50. It further includes a transition between the mounting surface 124 and raised portion 128.

Figure 8A:
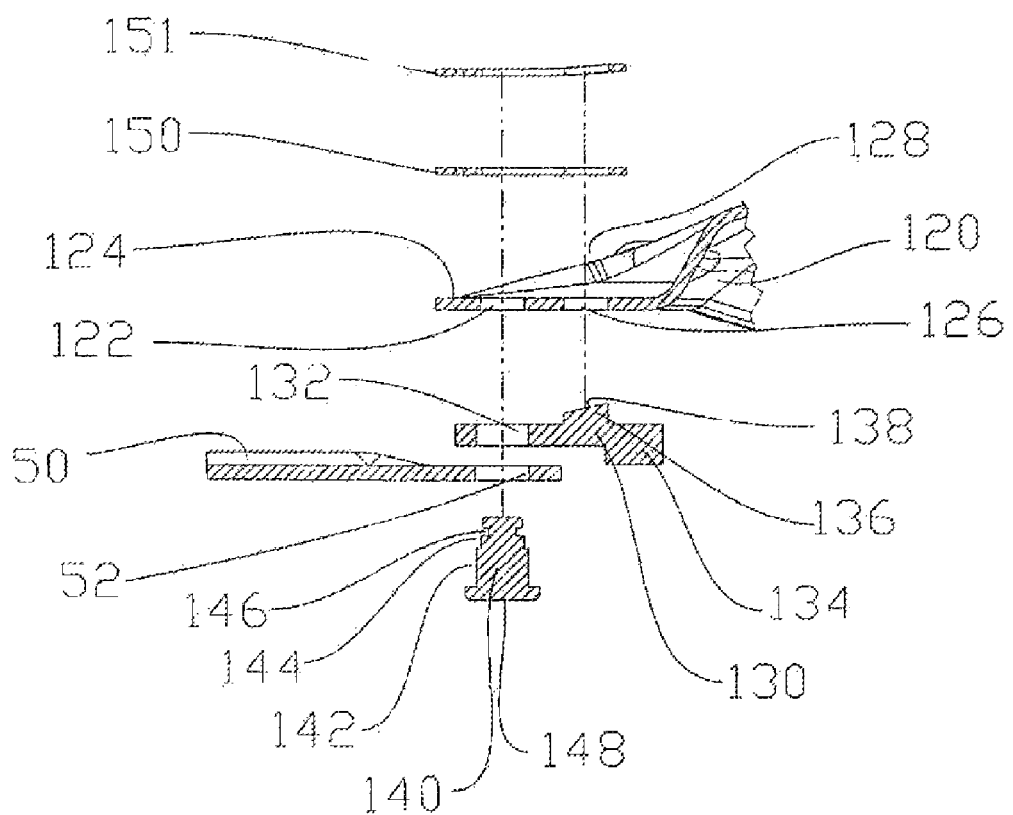
FIG. 8a is an exploded view of FIG. 7.

The knife adapter 130 includes a cylindrical aperture 132, a tab 134, and a cylindrical projection 136 as illustrated in FIGS. 8, 8A and 11. The knife adapter 130 is fixedly attached to the bottom side of disc body 120, the preferred attachment method is welding, such that cylindrical projection 136 passes through aperture 126 of disc body 120 and extends above the mounting surface 124.

Pin 140 includes a first cylindrical portion 142 with a diameter slightly smaller than the aperture 52 in the blade 50, and a second cylindrical portion 144 that is slightly smaller than the aperture 122 of disc 120. It also includes a head portion 148 with a diameter larger than the aperture 52 in the knife 50. It further includes a retaining groove 146, located on the second cylindrical portion 144, with a width that slightly exceeds the thickness of retainer 150, and has a groove diameter that is smaller than the diameter of the second cylindrical portion 144.

Retainer 150 is made of a spring material of a thickness such that a significant force is required in order to deflect the retainer 150, yet it can be deflected significantly without being permanently deformed. This thickness is equal to or less than the material thickness of the disc body 120. It includes a key-hole shaped aperture 152 with a first end 154 and a second end 156. The first end 154 is wide enough that retainer 150 can be installed over the second end 144 of pin 140. The second end 156 of the key-hole aperture 152 is cylindrical with a diameter slightly larger than the groove 146 of pin 140.

The blade 50 is mounted to the disc by passing pin 140 through the aperture 52 in knife 50, then through aperture 132 in knife adapter 130 and aperture 122 in disc 120 such that groove 146 is located above surface 124. Pin 140 is retained in this position by placing retainer 150 onto the pin, passing the first end of the key-hole aperture 152 over the second end 144 of pin 140 until the retainer is against the surface 124 of disc 120. The retainer is then slid perpendicular (right in FIGS. 8 and 8A) to the pin 140, such that the second end 156 of the keyhole shaped aperture 152 engages the groove 146.

Figure 7A:
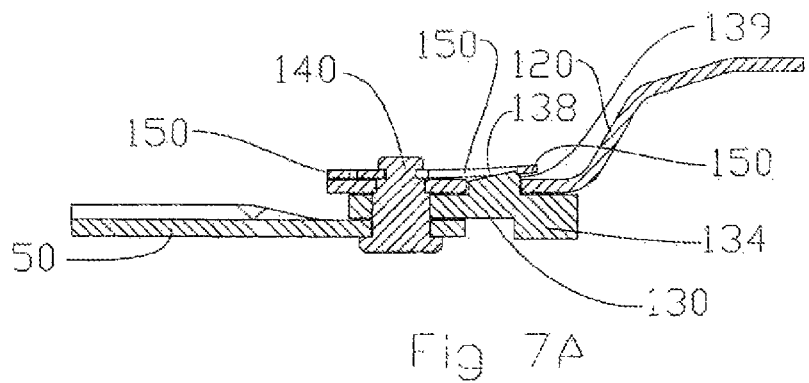
FIG. 7a is a view like FIG. 7, but of a slightly modified version wherein the retainer is not completely flat in the retained position so that it is easier to get a screwdriver under it for removal at a later time.

As retainer 150 is being slid along surface 124 a leading side 158 will come in contact with the ramped surface 138 of cylindrical projection 136 of knife adapter 130, which is extending above surface 124, through aperture 126 of disc 120. In order to slide retainer 150 to its proper position the retainer will be deflected up the ramped portion 138 of knife adapter 130. Upon reaching the installed position the retainer 150 will snap positively into place when first end of key-hole shaped aperture 152 slips over the cylindrical portion 136 of knife adapter 130, at such time the retainer 150 will return back towards its unloaded position, where it is straight as illustrated in FIG. 8A. Alternatively curved retainer 151, with a slight bend, could be utilized. If the curved retainer 151 is utilized, then it will snap towards its unloaded position represented by this slightly curved shape. In this position as shown in FIG. 8, the retainer 150 is held in position by the cylindrical projection 136. In order for it to move along surface 124 the leading side 158 of retainer 150 will need to be deflected far enough to clear the cylindrical projection 136 of blade retainer. In this manner, the pin 140 and knife 50 are retained to the disc 120, and removal of a knife 50 can be accomplished simply by using a tool capable of prying the leading end 158 of retainer 150 up and over the cylindrical projection 136 to the point it can be slid along surface 124. The removal operation is enhanced if the leading edge 158 is raised slightly above the top surface 124. This slightly raised area can be provided by a slightly curved retainer 151, or by providing an additional small step 139 as illustrated in FIG. 7A.

This mounting arrangement of FIGS. 5-8 thus provides a knife retention system that includes a retainer with a material thickness less than the material thickness of the disc, and a pin which does not require substantial wear protection. The raised portion 128 of the disc body 120 adequately protects the pin 140, thus there is no need for an additional wear protector. The overall height of the retaining components is small, minimizing the potential affect on the standing crop that is being cut.

Figure 12:
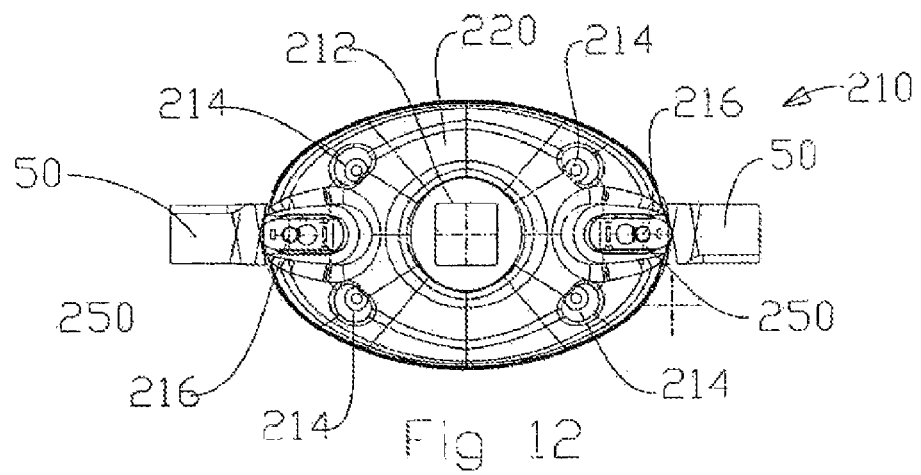
FIG. 12 is a top plan view of a mower disc with knives mounted in accordance with a second embodiment of the present invention.
Figure 13:
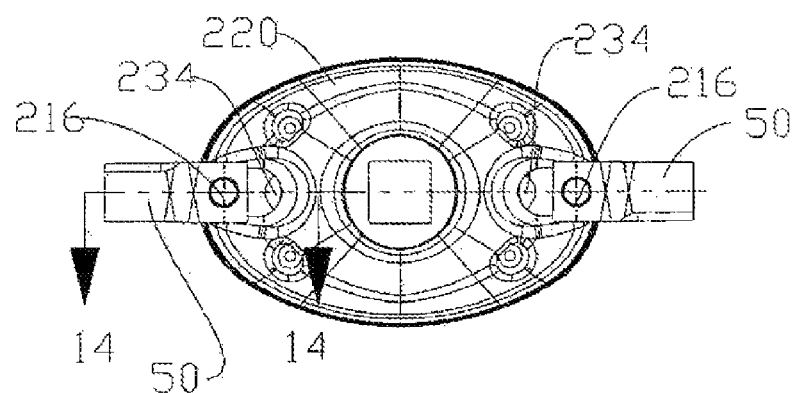
FIG. 13 is a bottom plan view of a mower disc with knives mounted in accordance with a second embodiment of the present invention.
Figure 14:
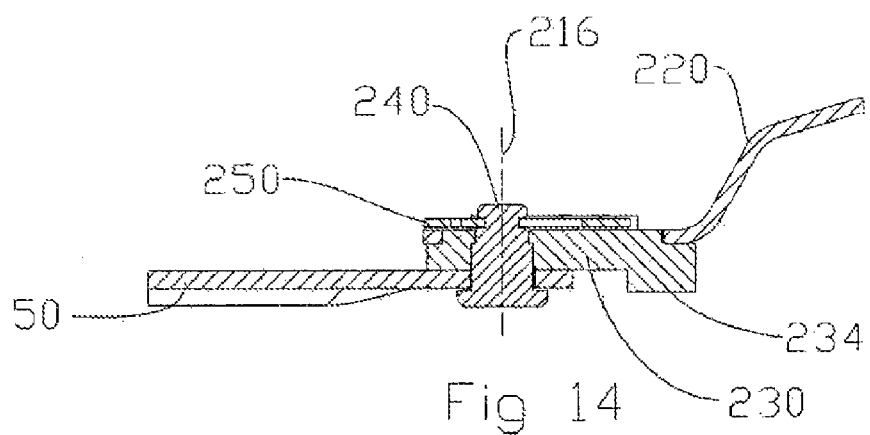
FIG. 14 is a cross-sectional side view of a mower disc, as defined by section line 14-14 in FIG. 13, with the knives mounted in accordance with a second embodiment of the present invention.

FIGS. 12-14 illustrate a second embodiment of a mower disc assembly 210 of the present invention. A disc 220 includes a center pilot hole 212 that controls its alignment and location when installed onto a cutter bar. Additional holes 214 allow retainers, not shown, to securely attach other components such as crop deflectors, not shown to the mower disc. Two knives 50 are installed onto the bottom of disc body 220, each with a knife adapter 230, a pin 240 and a retainer 250. The knife is free to rotate about pivot axis 216 until it contacts a tab 234 of the knife adapter 230.

Figure 16:
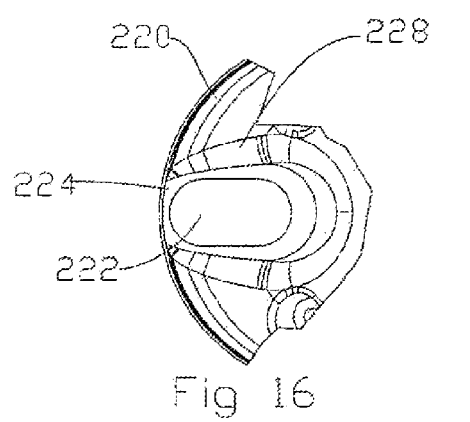
FIG. 16 is a partial top plan view of the mower disc configured for the knife mounting arrangement of a second embodiment of the present invention.

FIGS. 15-18 further illustrate a single knife mount of this embodiment of the present invention. The disc body 220 includes one slot-shaped aperture 222, and a mounting surface 224, as illustrated in FIG. 16, on each side, for each knife 50. The previously described embodiment could also be implemented with a disc body configured in this manner, if the knife retainer 130 were configured in accordance. Disc body 220 further includes a transition between the mounting surface 224 and raised portion 228.

Figure 15:
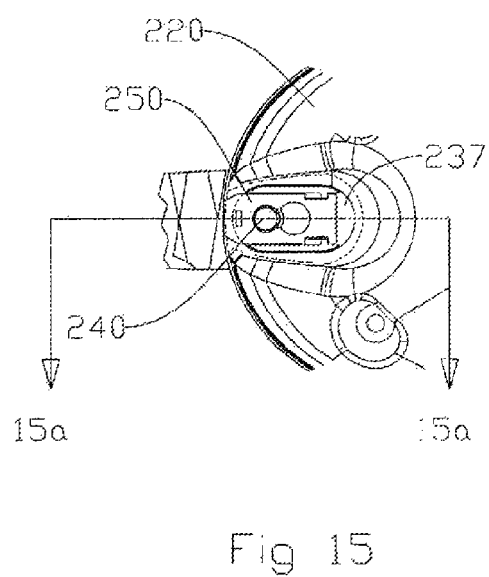
FIG. 15 is a partial top plan view of the mounting arrangement of a knife onto a mower disc of a second embodiment of the present invention.
Figure 17:
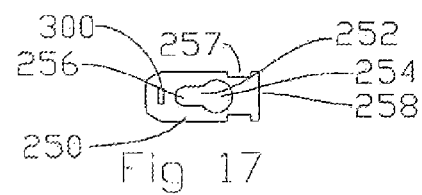
FIG. 17 is a top plan view of a blade retainer of the knife mounting arrangement of a second embodiment of the present invention.
Figure 18:
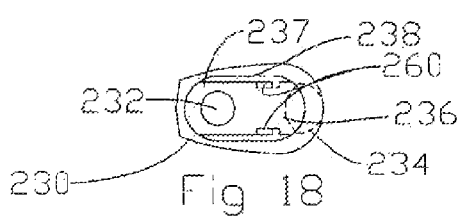
FIG. 18 is a top plan view of a knife adapter of the knife mounting arrangement of a second embodiment of the present invention.

The knife adapter 230 includes a cylindrical aperture 232, a tab 234, and a projection 236 shaped to fit into the slot-like aperture 222 of disc 220, as illustrated in FIGS. 15 and 18. Projection 236 includes a surface 237 and further includes a top portion 238 with ramped tabs 260. The knife adapter 230 is fixedly attached to the bottom side of disc body 220, the preferred attachment method is welding, such that projection 236 passes through aperture 222 of disc body 220 and top portion 238 extends above the mounting surface 224 while surface 237 is in-line with mounting surface 224, or is slightly raised above surface 224. However, an embodiment in which the knife adapter is releasable attached to the disc by means of bolts or screws will be later described with reference to FIGS. 24 to 28.

Figure 15A:
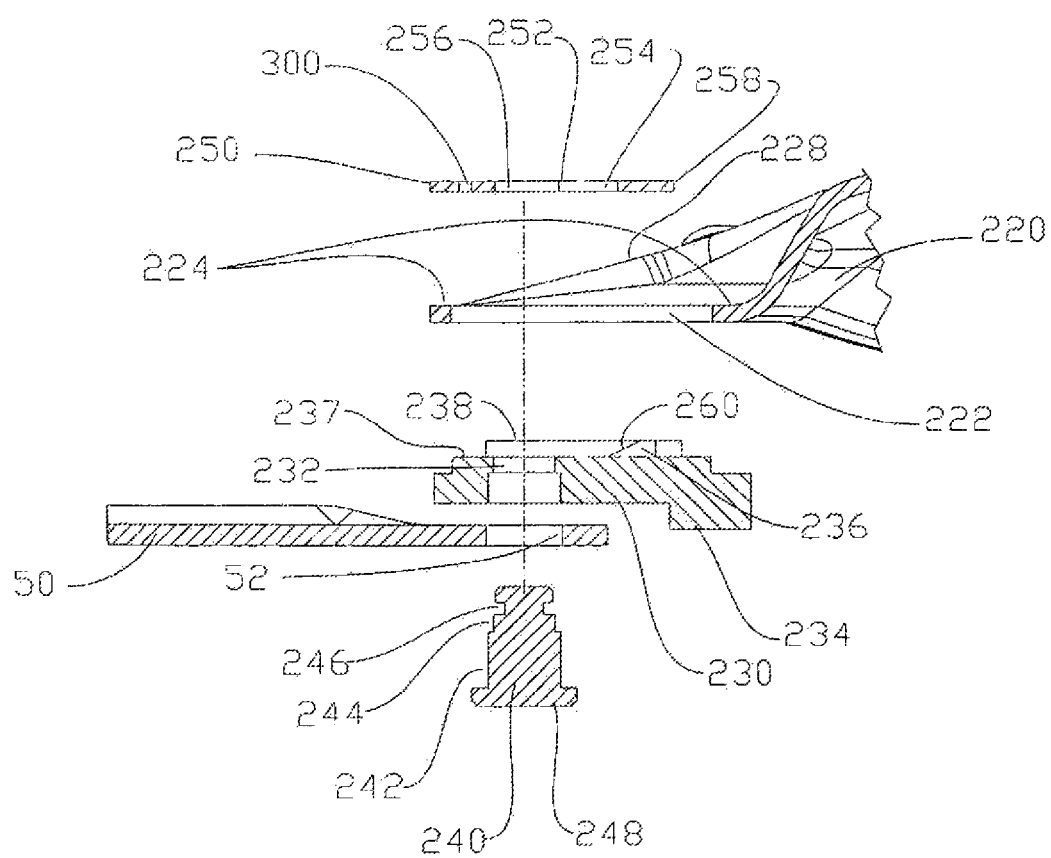
FIG. 15a is an exploded view of FIG. 14.

As illustrated in FIG. 15A, pin 240 includes a first cylindrical portion 242 with a diameter slightly smaller than the aperture 52 in the blade 50, and a second cylindrical portion 244 that is slightly smaller than cylindrical portion 244. It also includes a head portion 248 with a diameter larger than the aperture 52 in the knife. It further includes a retaining groove 246, located on the second cylindrical portion, with a width that slightly exceeds the thickness of retainer 250, and has a groove diameter that is smaller than the diameter of the second cylindrical portion 256.

Retainer 250 is made of a spring material of a thickness such that a significant force is required in order to deflect the retainer, yet it can be deflected significantly without being permanently deformed. It includes a key-hole shaped aperture 252 with a first end 254 and a second end 256. The first end 254 is wide enough that retainer 250 can be installed over the second end 246 of pin 240. The second end 256 of the key-hole aperture 252 is cylindrical with a diameter slightly larger than the groove 246 of pin 240, and smaller than the diameter of the second end 244 of pin 240. The retainer 250 further includes two notches 257, one on each side. Retainer 250 will have an unloaded shape, which is flat as illustrated in FIG. 15A. It could alternatively include a slightly bent portion at the leading edge 258, to assist removal, as previously described for retainer 151.

The blade 50 is mounted to the disc by passing pin 240 through the aperture 52 in knife 50, then through aperture 232 in knife adapter 230 such that groove 246 is located above surface 237 or 224. Pin 240 is retained in this position by placing retainer 250 onto the pin, passing the first end 254 of the key-hole aperture 252 over the second end 244 of pin 240 until the retainer is against the surface 224 of disc 220 or surface 237 of knife retainer 230. The retainer is then slid perpendicular to the pin 240, such that the second end 256 of the keyhole shaped aperture 252 engages the groove 246.

As retainer 250 is being slid along surface 226 or 237 a leading side 258 will come in contact with ramped tabs 260 of knife adapter 230, which extend above surface 224 and/or surface 237, through aperture 222 of disc 220. In order to slide to its proper position the retainer will be deflected up the ramped tabs 260 of knife adapter 230. Upon reaching the installed position the retainer 250 will snap into place when notches 257 align with the ramped tabs 260 of knife adapter 230, the retainer 250 returning back towards it unloaded position where it is straight as shown in FIG. 15. In this position, the retainer 250 is held in position by the tabs 260. In order for it to move along surface 224 or 237, the leading side 258 of retainer 250 will need to be deflected up, far enough to clear the ramped tabs 260 of knife adapter 230, before it can be slid along surface 224 or 237. In this manner, the pin 240 and knife 50 are retained to the disc 220, and removal of a knife 50 can be accomplished simply by using a tool capable of prying retainer 250 up to the point it can be slid along surface 124 or 237. The prying tool can, for example, be a screw driver and the leading edge may be held from the surface 124 by a tab, such that the retainer 250 is slightly deflected in the installed position, or by the fact that the retainer includes a slight bend.

The ramped tabs 260 of knife adapter 230 and the cooperating notches 257 of retainer 250 in this second embodiment provide the same function as the projection 136 and first end 154 of aperture 152 of the first embodiment. These are examples of many different types of arrangements that could be utilized to secure the retainer to the knife adapter, or a different feature of the mower disc itself.

The retainers, as in retainer 150 and 250, may include slot 300, as illustrated in FIG. 21, which is provided for disassembly. The slot 300 will be sized and positioned such that a screwdriver, or the like will be able to be utilized to engage the slot in order to assist in prying on the retainer to slide it relative to the disc.

Additional slots, such as slot 302 shown in FIG. 21, or other surface features may be added in order that the retainers will break at defined locations during disassembly. Thus, when the retainer is pried-on to remove the knife, the section of the retainer that is engaged with the tabs or projections of the knife adapter or disc will separate from that portion that is engaged with the pin. This would allow both of the resulting pieces to be easily removed.

FIGS. 19 and 20 illustrate optional configurations of the grooves in the pin 140 and 240. The grooves could be full annular grooves 247 as illustrated in FIG. 19, or slots 245, one on each side as illustrated in FIG. 20.

FIGS. 22 and 23 illustrate an additional embodiment of a retainer 350 with an additional curved section 352. The end 354 is narrow enough to fit into the key-hole slot of the retainer, similarly shaped to the key hole slots in retainers 130 and 230. The end 354 will then engage with the groove in the pin to increase the bearing surface under the pin head and providing a locking feature that prevents the retainer 350 from sliding. End section 356 forms a tapered profile, approximately paralleling the raised portion 128, 228 of disc 120, 220 such that the disc 120, 220 will protect it.

FIGS. 24 to 31 illustrate a further alternate embodiment according to the invention. These figures illustrate a third embodiment of a mower disc assembly 310 of the present invention. A disc 320 includes a center pilot hole 312 that controls its alignment and location when installed onto a cutter bar. Additional holes 314 allow retainers, not shown, to securely attach other components such as crop deflectors, not shown, to the mower disc. Two knives 50 are installed onto the bottom of the disc body 320. The FIGS. 24-26 and 28 illustrate a single knife mount of this embodiment of the present invention. The disc body 320 includes one aperture 322 and a surface 324, as illustrated in FIGS. 24 and 25, on each side, for each knife 50. Furthermore, the disc body 320 includes a transition between surface 366 and raised portion 328. Each knife is mounted by means of a knife adapter 330, a pin 340 and a retainer 350. These elements will now first be described separately.

Figure 27:
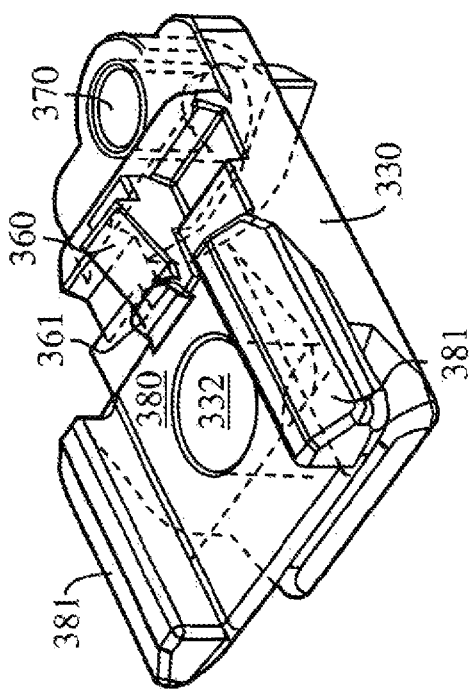
FIG. 27 is a perspective plan view of the knife adapter.
Figure 26:
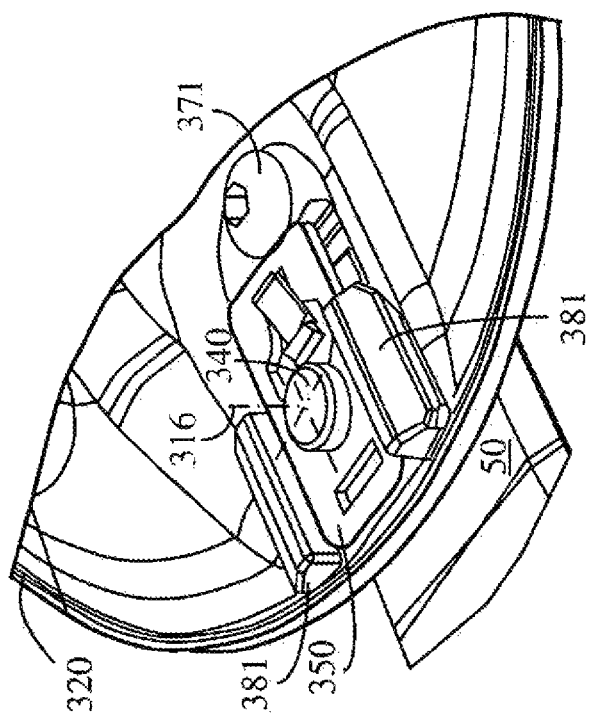
FIG. 26 is a partial, perspective plan view of a mower disc with a knife mounted in accordance with a third embodiment of the present invention.

The knife adapter 330, which is shown as a separate unit in FIGS. 27 and 29, is shaped to fit into the aperture 322 of disc 320. The knife adapter 330 is fixedly attached to the bottom side of disc body 320. On one side the knife adapter has a v-shaped groove 390; on its other side a screw thread 370 is tapped into the knife adapter. On mounting, the side of the knife adapter including the tapped hole 370 is first inserted into the aperture 322, subsequently the v-groove of the knife adapter is brought into contact with the edge of aperture 322 which is located closest to the circumference of the disc 320, and finally a vertically slightly slanting edge 383 of the knife adapter, located opposite the v-groove, is slid into the aperture of the disc 320. The slightly slanting edge 383 ensures a desirable fastening clamping of the knife adapter in the aperture of the disc 320. By means of a bolt connection, preferably a bolt 371 with a space-saving (flat) head, the knife adapter 330 is fixedly mounted to the bottom side of disc body 320. After mounting, the situation as shown in FIGS. 24, 25, 26 and 28 is obtained. The knife adapter includes a cylindrical aperture 332 and a tab 334. The upper side of the knife adapter 330 includes a base plane 380 for a retainer. Said base plane includes ramped tabs 360 and 361, of which tab 360 has the main function of attaching the retainer. On both sides of the base plane 380 of the retainer there are provided two thick edges 381. The greatest distance between the edge ends is greater than the width of the aperture 322 in the disc 320.

As illustrated in FIGS. 28 and 30, the fastening pin 340 for the knife mounting includes a first cylindrical portion 342 with a diameter slightly smaller than the fastening aperture in the blade 50, and a second cylindrical portion 344 that is slightly smaller than cylindrical portion 342. It also includes a head portion 348 with a diameter larger than the aperture in the knife. It further includes a retaining groove 346, located on the second cylindrical portion, with a width that slightly exceeds the thickness of retainer 350, and consisting of slots, one on each side as illustrated in FIG. 30.

The retainer 350, shown in FIG. 31, is made of a spring material of a thickness such that a significant force is required in order to deflect the retainer, yet it can be deflected significantly without being permanently deformed. It includes a slot-shaped aperture 352 with a first end 354 and a second end 356. Aperture 352 is wide enough that retainer 350 can be installed over the second end 344 of pin 340. The width of second end 356 of the slot-shaped aperture 352 is slightly larger than the groove 346 of pin 340, and smaller than the diameter of the second end 344 of pin 340. Retainer 350 will have an unloaded shape, which is flat as illustrated in FIG. 31. It could alternatively include a slightly bent portion at the side of slide 358, to assist removal, as previously described for retainer 151.

The blade 50 is mounted to the disc by passing pin 340 through the aperture in knife 50, then through aperture 332 in knife adapter 330 such that groove 346 is located above surface 380. Pin 340 is retained in this position by placing retainer 350 onto the pin, passing the aperture 352 over the second end 344 of pin 340 until the retainer is against the base plane 380 of knife adapter 330. The retainer is then slid perpendicular to the pin 340, such that the second end 356 of the aperture 352 comes into contact with the second end 344 of pin 340. After mounting, the knife is free to rotate about pivot axis 316 until it contacts a tab 334 of the knife adapter 330.

The slots of retaining groove 346 on both sides of pin 340 prevent pin 340 from rotating in the connection. Destructive pin wear is thus prevented in a simple and effective manner.

As retainer 350 is being slid along surface 380 the leading slide 358 will come into contact with ramped tabs 360 and 361 of knife adapter 330, which extend above surface 380. In order to slide to its proper position the retainer will be deflected up the ramped tabs 360 and 361 of knife adapter 330. On reaching the installed position the retainer 350 will snap positively into place when first end 354 of shaped aperture 352 slips over ramped tab 360. As the base plane for the leading slide 358 is located somewhat higher than base plane 380, the retainer 350 will not completely return towards its unloaded position. There is now pre-tension in retainer 350, which contributes to an enhanced clamping. The presence of ramped tab 361 is the result of further safety-thinking. If the situation should ever occur that the retainer 350 looses contact with ramped tab 360, ramped tab 361 will ensure a second safety guarantee. In this case retainer 350 will catch behind ramped tab 361. The engagement of the part of the retainer that is inside the slots of pin 340 is maintained when the retainer has been slid from catching ramped tab 360 to catching ramped tab 361. Therefore, in this situation a complete blocking of pin 340 is maintained. Breaking of the bolt 371 by means of which the knife adapter is fastened in the disc 320 does not create a dangerous situation owing to the fact that the greatest distance between the ends of the thick edges 381 is greater than the width of the aperture 322 in the disc 320. If breaking should ever occur, then the thick edges 381 of the knife adapter will ensure that the knife adapter will not come loose from the disc. The thick edges 381 of the knife adapter further ensure protection against wear and damage of the components of the knife fastening concept that are located inside the edges, in particular of the fastening pin and the retainer. The knife fastening is thus properly secured.

The ramped tabs 360 and 361 of knife adapter 330 secure the retainer to the knife adapter. In the normal fastening position, the retainer 350 is held in position by the tab 360. Removal of a knife 50 can be accomplished simply by using a tool capable of prying slide 358 of retainer 350 up and over the ramped tabs 360 and 361 to the point it can be slid along surface 380. The removal operation is enhanced if slide 358 is raised slightly above the top surface 382 or hangs over to some extent. In order for it to move along surface 380, slide 358 of retainer 350 will need to be deflected up, far enough to clear the ramped tabs 360 and 361 of knife adapter 330, before it can be slid along surface 380. This can be accomplished simply by using a tool capable of prying retainer 350 up to the point it can be slid along surface 380. The prying tool is disposed for example between the fastening bolt of the bolt connection between the knife adapter and slide 358 of retainer 350. By means of a pushing movement against the rear side 358 of the retainer the latter is slid gradually in a direction away from the disc center. When the retainer is pried-on to remove the knife, the section of the retainer that is engaged with the groove of pin 340 will separate from that portion at the moment when the retainer has been slid to such an extent that aperture 352 surrounds the retainer. Pin 340 and knife 50 can now easily be removed. The prying tool can for example be a screw driver. The retainer may include slot 300. The slot 300 will be sized and positioned such that a screwdriver or the like will be able to be utilized to engage the slot in order to assist in prying on the retainer to slide it relative to the base plane of the knife adapter.

Still referring to FIGS. 24-31, an apparatus for a mower is shown having a disc 320 adapted to rotate about an axis of rotation. While the word "disc" is used herein, "disc" in this document is defined as any member of any shape that can be disposed for rotation about an axis. The disc 320 has a first aperture 322 disposed therein, the aperture 322 including an inner side 322a nearest the axis of rotation, first and second sides 322b & 322c and a outer side 322d. The disc 320 also includes a second aperture 326 spaced from the first aperture 322. An adaptor 330 has a groove 381 configured to engage the first and second sides of the aperture 322 in the disc.

A first opening 370 is disposed in the adaptor 330, the first opening 370 being located to align with the second aperture 326 in the disc 320 when the groove 381 is properly engaged with the outer side of the first aperture 322 in the disc 320. There is also a second opening 332 in the adaptor 330.

A ramp section 360 is disposed on the adaptor 330. A first fastener 371 passes through the second aperture 326 in the disc 330 and into the first opening 370 in the adaptor 330.

There is also a second fastener 340. A knife 50 is secured to the disc 330 by the second fastener 340 passing through the second opening 332 of the adaptor 330. The second fastener 340 includes at least one slot 346.

There is also a third fastener 350 having a keyhole shaped hole 352. A small section of the keyhole shaped hole 352 is configured to engage with the at least one slot 346 in the second fastener 340 and an enlarged section of the keyhole shaped hole 352 is configured to engage with the ramp section 360 of the adaptor 330 such that the second fastener 340 is retained in position with the adaptor 330. The adaptor 330 is thereby secured to the disc 320 independently of the first fastener 371.

Obviously many modifications and variations of the present invention are possible in light of the above teachings, including variations in the shape of the knife mount pin and cooperating apertures in the knife adapter. It is known to use various configurations of these components, other than the herein specified cylindrical shapes. These would include conical sections, and could include pins with various cross-sections such as square or hexagonal. It is therefore to be understood that, within the scope of the appended claims, the invention may be practiced otherwise than as specifically described.

The invention claimed is:

1. A rotary mowing implement, comprising:
a rotary cutter bar disc;
at least one hub connected to the cutter bar disc, the hub having a vertically disposed opening therein disposed about a vertical axis;
a blade element having a hole therein;
a coupling pin disposed about a longitudinal axis, the coupling pin having a groove of a predetermined shape coupling the blade element to the hub, the pin being insertable through the hole in the blade and through the vertically disposed opening in the hub and being removeably coupled to the hub; and
a retaining device that can be moved in a direction transverse to the vertical axis of the opening in the opening in the hub between a first position wherein the retaining mechanism is disposed in the groove of the coupling pin to lock the coupling pin to the hub and a second position wherein the retaining device is not in the groove of the coupling pin to release the pin so that it can be removed from the hub, the retaining device having a top portion, a bottom portion, a left portion and a right portion; and
wherein the hub includes guide structure in an abutting relationship with the the left portion and right portion of the retaining device in at least the first and second positions of the retaining device for guiding the retainer member in a linear direction as the retainer member moves between the first and second position thereof.

2. A rotary mowing implement, comprising:
a rotary cutter bar disc;
at least one hub connected to the cutter bar disc the hub having an opening therein disposed about a vertical axis;
a blade element having a hole therein;
a coupling pin disposed about a longitudinal axis, the coupling pin having a groove of a predetermined shape coupling the blade element to the hub, the pin being insertable through the hole in the blade and through the vertically disposed opening in the hub and being removeably coupled to the hub; and
a retaining device having a first position wherein the retaining device is disposed in the groove of the coupling pin to lock the coupling pin to the hub and a second position wherein the retaining mechanism is not in the groove of the coupling pin to release the coupling pin so that it can be removed from the hub, the retaining device having a top portion, a bottom portion, a left portion and a right portion; and
wherein the hub includes guide structure in an abutting relationship with the left portion and right portion of the retaining device in at least the first and second positions of the retaining device for guiding the retainer member in a linear direction as the retainer member moves between the first and second position thereof.

* * * * *